US011711140B2

(12) United States Patent
Kay et al.

(10) Patent No.: US 11,711,140 B2
(45) Date of Patent: Jul. 25, 2023

(54) POINTING ERROR MITIGATION (71) Applicant: HUGHES NETWORK SYSTEMS, LLC, Germantown, MD (US)

(72) Inventors: Stan Kay, Germantown, MD (US); Udaya Bhaskar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 212 days.

(21) Appl. No.: 17/136,821

(22) Filed: Dec. 29, 2020

(65) Prior Publication Data
US 2022/0209858 A1    Jun. 30, 2022

(51) Int. Cl.
H04B 7/185    (2006.01)
H04W 36/22    (2009.01)
H04W 36/00    (2009.01)

(52) U.S. Cl.
CPC .... *H04B 7/18541* (2013.01); *H04W 36/0058* (2018.08); *H04W 36/22* (2013.01)

(58) Field of Classification Search
CPC ........ H04B 7/18513; H04B 7/00; H04B 1/00; H04B 17/00; H04B 7/0851; H04B 7/185; H04B 7/18515; H04B 7/18541; H04W 36/22; H04W 36/00
See application file for complete search history.

(56) References Cited

U.S. PATENT DOCUMENTS

| | | | |
|---|---|---|---|
| 6,771,929 B1 | 8/2004 | Nivens et al. | |
| 2004/0242152 A1* | 12/2004 | Jarett | H04B 7/2041 455/12.1 |
| 2007/0285312 A1 | 12/2007 | Gao et al. | |
| 2009/0190491 A1 | 7/2009 | Miller | |
| 2010/0231442 A1 | 9/2010 | Craig et al. | |
| 2011/0268017 A1 | 11/2011 | Miller | |
| 2014/0080408 A1* | 3/2014 | Miller | H04B 17/40 455/12.1 |
| 2017/0111845 A1* | 4/2017 | Ni | H04W 16/28 |
| 2020/0244346 A1* | 7/2020 | Goettle | H04B 7/0408 |

FOREIGN PATENT DOCUMENTS

WO    WO-2016115394 A1 *    7/2016 ......... H04B 7/18528

OTHER PUBLICATIONS

International Search Report and Written Opinion issued in Application No. PCT/US2021/065498, dated Mar. 30, 2022.
Fusco, et al., "Developments in retrodirective array technology", IET Microw. Antennas Progag., 2013, vol. 7, Iss. 2, pp. 131-140.

* cited by examiner

Primary Examiner — Jinsong Hu
Assistant Examiner — Farideh Madani
(74) Attorney, Agent, or Firm — Potomac Technology Law, LLC (57) ABSTRACT An apparatus and method are disclosed for mitigating pointing errors resulting from satellite antennas. Reports are received from terminals in a beam hopping satellite communication system, and a pointing error associated with a satellite antenna is determined. The best beam for communicating with each terminal is selected based on the pointing error. A beam list containing the instantaneous traffic demand of terminals for each beam in the system is generated. An active beam set is then selected from the beam list for transmitting data during the next hop in the satellite communication system.

21 Claims, 8 Drawing Sheets

POINTING ERROR MITIGATION

BACKGROUND INFORMATION

Very high throughput satellite (VHTS) systems are used to provide voice and data access with higher speeds and capacity than existing high throughput satellite (HTS) systems. The increased throughputs have also necessitated increases in the size of the antenna. The larger antenna size requires lower power to achieve the same link budget at the receiver. As the antenna size increases, however, the coverage area of individual beams is reduced because the diameter of the antenna is inversely proportional to the diameter of individual beams on the ground.

Satellite coverage areas are defined by beams which overlay fixed regions over the earth's surface. Satellite communication systems typically employ one or more gateways (or satellite hubs) to provide service to customers utilizing terminals such as very small aperture terminals (VSATs), mobile terminals such as handsets, transportable terminals, etc. Terminals and gateways are often installed at a fixed location and/or registered to a specific beam, thereby enabling communication with the satellites via the beams. The signal from the satellite nominally peaks at the center of the beam. The beam pattern, however, may move over time due to disturbances on-board the satellite such as thermal, propulsion, and mechanical. Fixed terminals such as VSATs are traditionally associated with the same cell throughout their service life. When the satellite antenna is correctly pointed, the decrease in antenna directivity is on the order of 4-6 dB radially outward from the peak to the beam edge. When the satellite antenna is not correctly pointed, the drop at the edge can be much larger.

The traditional method of compensating for this reduced directivity is to increase the error correcting coding thus maintaining the link, at the expense of throughput. As the antenna continues to mispoint, throughput for the beam decreases, and communication with terminals at the edge of beam can degrade to a complete loss. The antenna pointing error can also increase as a result of difficulties associated with keeping larger antennas used in VHTSs accurately pointed. The number of terminals that may be located at the edge of a beam will also increase because more beams are required to service the coverage area. Depending on the location of the terminal and the amount of pointing error, it is possible that the signal quality from the terminal's assigned beam falls below the signal quality of an adjacent beam. Nonetheless, the terminal must continue utilizing its assigned beam, because stationary terminals such as VSATs lack the ability to perform beam to beam handovers found in mobile terminals. VSATs also lack the ability to select the best beam available to which the handover should be performed since the available beams can vary depending on the direction and degree of pointing error of the satellite antenna.

BRIEF SUMMARY

An apparatus and method are disclosed for mitigating pointing errors resulting from satellite antennas. According to an embodiment, the apparatus includes one or more processors configured to: receive reports from a plurality of terminals in a beam hopping satellite communication system; determine a pointing error associated with a satellite antenna based, at least in part, on contents of the reports; select a best beam for each terminal, wherein each best beam corresponds to the best beam for communicating with the selected terminals based, at least in part, on the pointing error; generate a beam list containing an instantaneous traffic demand of terminals for each beam in the satellite communication system; select an active beam set from the beam list for a next hop in the satellite communication system; and generate a data block for transmission via the active beam set on the next hop, wherein the data block contains information corresponding to the instantaneous traffic demand of the active beam set.

According to another embodiment, the method includes: receiving reports from a plurality of terminals in a beam hopping satellite communication system; determining a pointing error associated with a satellite antenna based, at least in part, on contents of the reports; selecting a best beam for each terminal, wherein each best beam corresponds to the best beam for communicating with the selected terminals based, at least in part, on the pointing error; generating a beam list containing an instantaneous traffic demand of terminals for each beam in the satellite communication system; selecting an active beam set from the beam list for a next hop in the satellite communication system; and generating a data block for transmission via the active beam set on the next hop, wherein the data block contains information corresponding to the instantaneous traffic demand of the active beam set.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and method for mitigating pointing errors resulting from satellite antennas are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
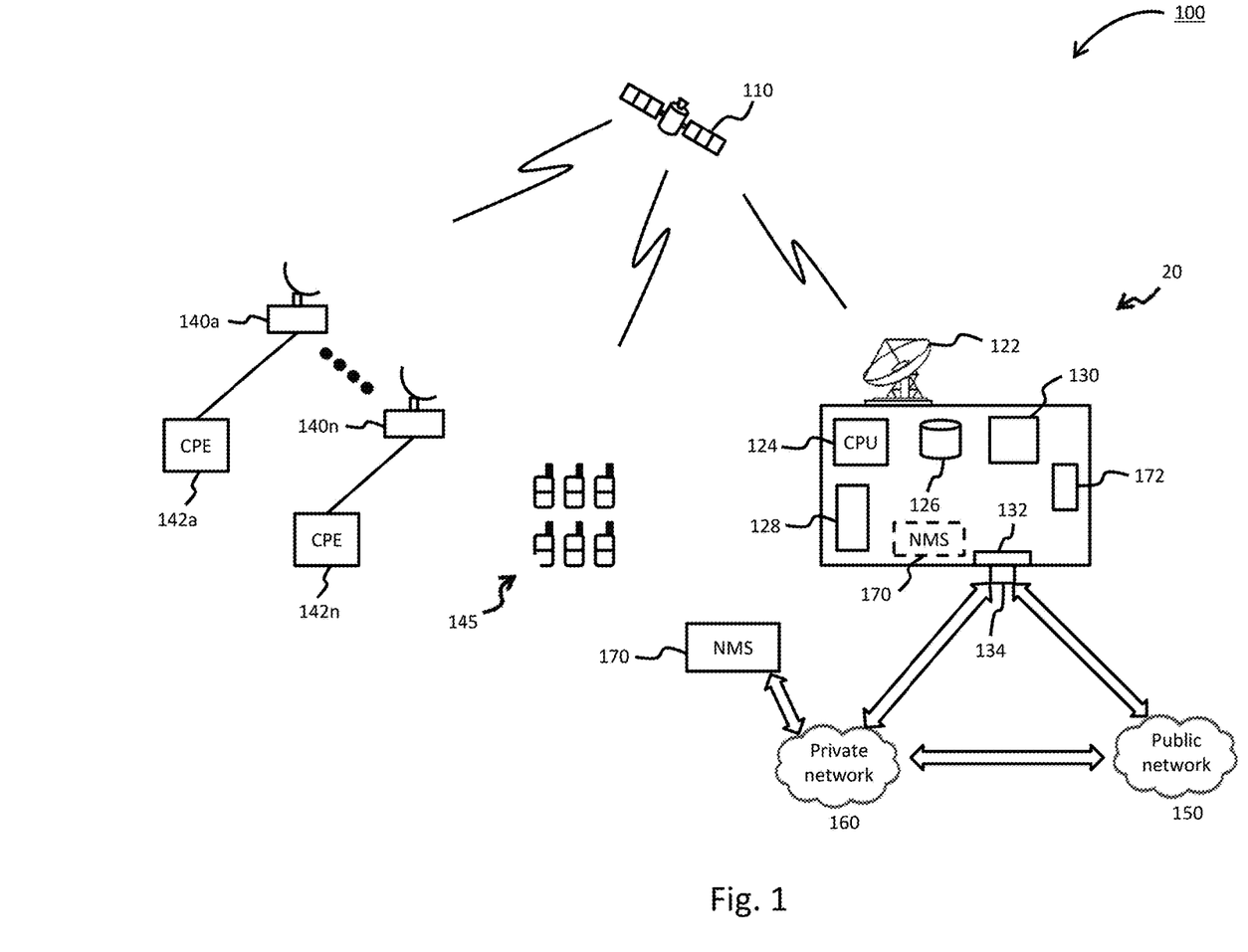
FIG. 1 is a diagram of a system for providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The NMS 170 can also be located in the gateway 120 in place of, or in addition to, being remotely located depending on the specific implementation. The gateway 120 can further include a network interface 132, such as one or more edge routers, for establishing connections with a terrestrial connection point 134 from a service provider. Depending on the specific implementation, however, multiple terrestrial connection points 134 may be utilized.

According to various features, the satellite communication system 100 is configured as a beam hopping system capable of serving all terminals with beams from a single antenna and on a single polarization. Furthermore, all beams operate using the same frequency band. According to such features, handovers between beams do not require frequency or polarization changes between the pre-handover beam and the post-handover beam. Such features further facilitate the possibility of a "make-before-break" handover, in which the VSAT is served from both beams when the best beam cannot be determined for any reason. This would result, for example, in data being replicated and sent to the terminal in two different beams. The terminal could then discard duplicates as necessary.

In contrast to conventional satellite systems wherein a terminal is assigned to a beam at installation and remains assigned to that same beam, the disclosed features do not create a permanent association of terminals to a beam. At any given time, a beam in the satellite communication system 100 contains a data multiplex serving a group of terminals. The terminals within this multiplex are best served by that beam. Furthermore, terminals may move between multiplexes as the satellite antenna pointing changes.

As discussed in greater detail below, the disclosed features provide for terminal reports to be received at a beam manager that can be located within the gateway 120 or the NMS 170. The reports are processed to estimate an antenna pointing error for each beam and to predict the EsNo a terminal would receive within its optimal beam. The pointing error is used to choose a beam to best serve each VSAT. The current traffic demand for all the terminals in the multiplex that is currently associated with the same beam are then added together. This results in an ordered list of beams to be serviced. The beam manager, therefore, constantly regroups the terminals so that they are best served by the appropriate beam. For example, the association of a particular terminal to a beam can change from hop to hop (e.g., hop1=beam_10, hop2=beam_12, hop3=beam 9, etc.).

The beam manager subsequently determines a subset of the beam list that is compatible with the reuse constraints of the system. More particularly, on a given hop, not all beams can be serviced because doing so might create unacceptably high interference levels. There may also be other limits on the total number of beams such as system bandwidth or total power available. The subset of the beam list is then used to identify which terminal queues to service in the current interval for each beam. Data removed from those queues is coded and modulated according to the EsNo estimates provided for each terminal. The composite waveform for each beam is called a superframe. Each hop includes transmission of a superframe to each selected beam. The process is then repeated for the next hop.

According to an embodiment, the satellite 110 can include a second antenna that operates on an opposite polarization as the first antenna. The second antenna can further overlay the same coverage area and operate in the same manner as the first antenna. The beam manager can be configured to independently perform operations for each antenna. Thus, both antennas can provide communication services with minimal interference. Alternatively, the existing antenna (first antenna) can be configured to incorporate, in part, dual polarization transmitting elements. The antenna would, therefore, be capable of overlaying the same coverage area with second beams having opposite polarization as the existing beams. More particularly, the antenna would be capable of simultaneously overlaying the coverage area with first beams having a first polarization and second beams having a second polarization that is opposite to that of the first beams.

Figure 2:
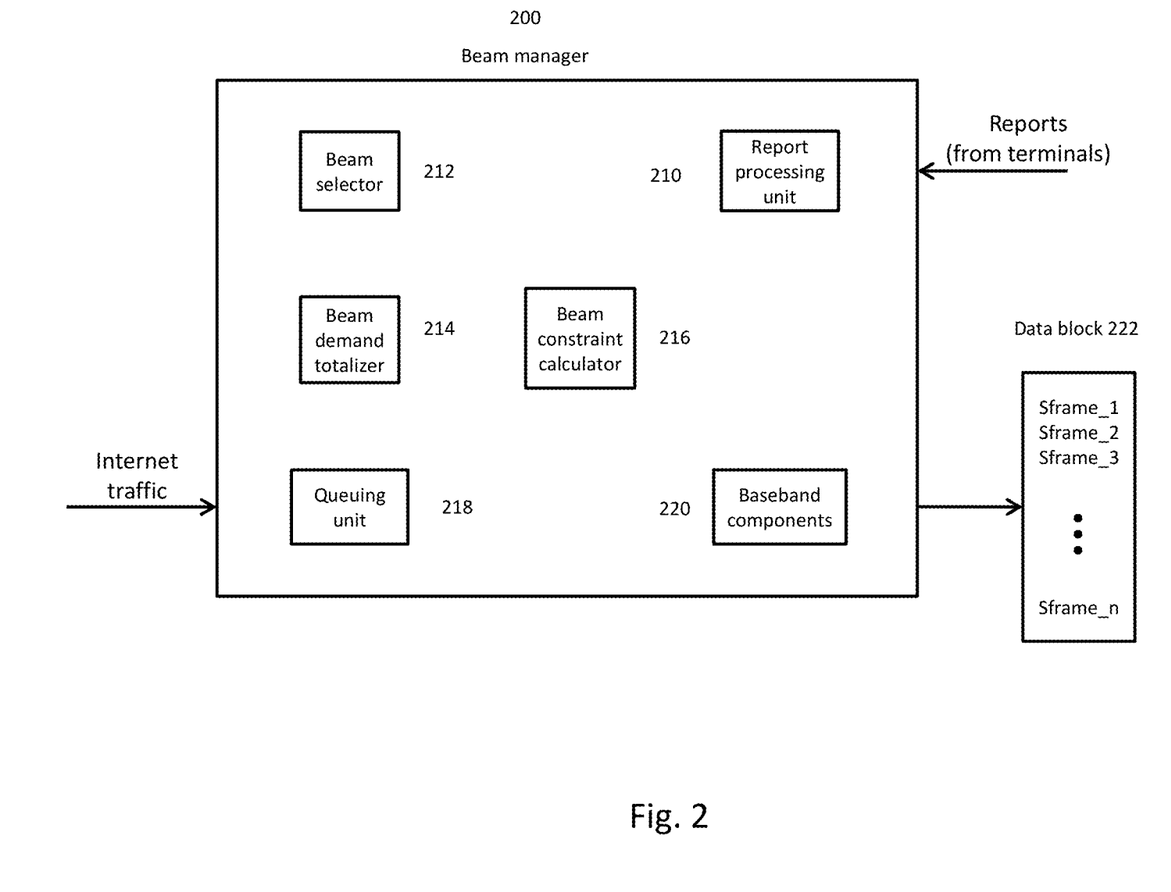
FIG. 2 is a diagram of beam manager used in the system of FIG. 1, according to various embodiments.

FIG. 2 illustrates a beam manager 200 in accordance with one or more embodiments. The beam manager 200 can be located and configured in various manners. As illustrated in FIG. 1, the gateway 120 can incorporate a beam manager 172 on-site to perform all necessary functions and calculations for implementing various features that are further described below. According to further embodiments, the beam manager 172 can also be incorporated within the NMS 170. This can occur in implementations that provide for a NMS 170 that is remotely located from, or co-located with, the gateway 120. When co-located with the gateway 120, the NMS 170 may or may not incorporate the beam manager 172. More particularly, such embodiments can provide the beam manager 172 as part of the gateway 120, or as part of the NMS 170 that is co-located within the gateway 120. In addition, one or more functions of the beam manager 172 can be performed, in whole or in part, by components of the gateway 120 such as the CPU 124 or data storage unit 126.

As illustrated in FIG. 2, the beam manager 200 includes a report processing unit 210, a beam selector 212, a beam demand totalizer 214, a beam constraint calculator 216, and a queuing unit 218. According to an embodiment, the beam manager 200 can include components 220 that provide baseband signal processing functionality. For example, when the beam manager 200 is integrated within, or co-located with, the gateway 120, these the baseband components 220 would correspond to the baseband components 128 (shown in FIG. 1). When the beam manager 200 is part of, or integrated with, the NMS 170, baseband components 220 may only perform pre-processing functions that determine parameters (e.g., encoding parameters) to be supplied to the baseband components 128 prior to transmission from the gateway 120. For example, such parameters can be determined by the baseband components 220 located within the NMS 170 and supplied to the baseband components 128 located within the gateway in order to apply the correct modulation, coding, etc. for transmitting signals to the satellite 110 via the radio frequency transmitter 122.

According to various embodiments, terminals (e.g., 140, 145) operating within the satellite communication system generate reports that are supplied to the beam manager 200 at periodic and/or aperiodic intervals, or after each beam hop. These reports can contain various information such as signal strength, interference levels, etc. that can be used to determine a quality level of the signal being received by the terminal at a particular instant of time. Reports from all terminals within the satellite communication system are supplied to the report processing unit 210 where they are analyzed in order to estimate an antenna pointing error associated with each terminal. Furthermore, the estimated antenna pointing error associated with the terminals can be used to determine the pointing direction of the satellite antenna. As previously discussed, a single antenna is used to generate all of the beams used in the satellite communication system. Accordingly, the antenna pointing error is applicable to all terminals communicating with the satellite.

Large antennas experience distortions due to thermal gradients which may results in different pointing errors for different beams. The magnitude of this effect on pointing error can be determined prior to satellite launch. According to an embodiment, if the effect is determined to be significant, different pointing errors can be determined for different locations. For example, the magnitude of the thermal gradients can be examined to group the beams based on a predicted effect on the pointing error. This can result, for example, if the beam coverage area being subdivided into two or more subsections based on the different pointing errors. The best beam for each terminal would subsequently be selected based on the pointing error associated with the subsection where the terminal is located.

According to at least one embodiment, the report processing unit 210 can also predict the best EsNo (ratio of symbol energy to noise energy) achievable by each terminal when operating within the optimal beam for that terminal. The report processing unit 210 subsequently supplies all information pertaining to the antenna pointing error to the beam selector 212. The beam selector 212 examines all of the pointing error information pertaining to the terminals and determines the best beam for use by each individual terminal at the current time. This results, for example, in a table (or other data structure) containing a mapping of each terminal to the best beam usable for communicating.

For example, consider a system with 1000 beams and 10,000 terminals. The mapping produced by the beam selector 212 would contain 10,000 entries corresponding to each terminal in the system. Each entry would also be matched to a beam identification which corresponds to the best beam for communicating with the particular terminal. Since the matching is performed based on factors such as the antenna pointing error and signal quality level of each terminal, the result is a grouping of terminals that can be best served by particular beams. For example, terminals 1 to 10 may be best served by beam #20, terminals 11 to 40 may be best served by beam #25, terminals 41 to 55 may be best served by beam #100, etc. Accordingly, the number of terminals matched to a particular beam will not be constant. Furthermore, depending on the exact pointing location of the satellite antenna and variations, a terminal may be matched to a particular beam during one hop, and matched to a different beam during a subsequent hop. The grouping of terminals with their best beams, therefore, dynamically changes based on changing conditions as determined by analyzing reports received from the terminals.

According to various embodiments, each terminal can create a report that includes an EsNo based on current measurements. If the terminal is unable to determine which beam encompasses its current location, the EsNo can be calculated as follows:

$$EsNo(i,n) = EsNo \text{ report from terminal}(i) \text{ at superframe}(n)$$

In this case, the beam manager 200 (or report processing unit 210) can add the beam number to the measurement because each superframe corresponds to a specific beam (i.e., one to one correspondence).

$$EsNo(i,j,n) = EsNo \text{ report from VSAT}(i) \text{ in Beam}(j), \text{ at superframe}(n)$$

Alternatively, the transmission to the terminal can contain the beam number and the terminal can incorporate that into the report to indicate that:

terminal(i) is in beam(j1) at superframe(n)

Due to beam hopping and pointing error, however, the terminal may be located in Beam(j2) at a later time.

The report processing unit 210 can be configured to collect the terminal reports containing EsNo values associated with Beam(j) for some predetermined number of previous samples (reports) and/or a predetermined time period. The report processing unit 210 can subsequently perform a best fit match to determine the current center (pointing) for that beam. The best fit is based on the expected EsNo at each point in the beam based on knowledge of the beam shape. An estimate for each beam center pointing, BC(j), for the current time can be determined as follows:

$$BC(j, n) = \text{Estimated Beam Center for Beam } (j) \text{ at time } n$$
$$= \text{Best fit matching } EsNo(i, j, n), \ldots EsNo(i, j, n-k),$$
$$\text{for reports from all terminals } i \text{ which are associated}$$
$$\text{with beam } j, \text{ i.e. the last } k \text{ samples from this beam.}$$

An overall average can also be formulated as well using the estimates and the ideal beam centers.

$$PE(n) = Average_j\{BC(j, n) - BC_{ideal}(j)\}$$
$$= \text{Estimated Antenna Pointing Error at time } n$$

Since all beams originate from the same antenna, they typically share a common pointing error. Depending on the specific antenna and circumstances, however, adjustments can be made as needed to the BC(j,n) to adjust the estimates for each beam.

Once PE(n) has been obtained, the beam manager 200 computes a service area for each beam. This can correspond, for example, to a hexagon centered on BCideal (j)+PE(n) with a known radius. The beam manager 200 then associates each terminal(i) whose U, V coordinates fall within the contour of beam(j) to that beam, i.e., terminal(i)=>terminal (i,j). Depending on the specific implementation, the beam selector 212 can also compute the service area for each beam and associate the terminals to the beam.

The beam demand totalizer 214 determines the instantaneous amount of traffic demand for each beam based on the terminal matching performed by the beam selector 212. According to at least one embodiment, the beam demand totalizer 214 examines data contained in the queuing unit 218 in order to determine the instantaneous amount of traffic demand for each terminal. The queuing unit 218 is configured to store external traffic, such as internet traffic, that must be supplied to the terminals. According to an embodiment, the queuing unit 218 maintains a separate queue for each terminal in the satellite communication system in order to store the internet traffic destined for that terminal. Depending on the specific implementation, the queuing unit 218 may only maintain queues for terminals that are currently active in the satellite communication system. Thus, storage space that would otherwise be unavailable can be reallocated to store Internet traffic for the active terminals.

The beam demand totalizer 214, therefore, examines each queue maintained by the queuing unit 218 in order to determine the instantaneous traffic demand for each terminal. Since the terminals have previously been mapped to their best beams, the beam demand totalizer 214 can sum the instantaneous traffic demand for each terminal associated with a particular beam in order to determine the instantaneous traffic demand for that beam. This results in a beam list which contains all of the beams within the satellite communication system and the corresponding levels of traffic demand.

The beam constraint calculator 216 examines the beam list in order to determine an active beam set for the current hop being prepared. According to at least one embodiment, the beam constraint calculator 216 examines the beam list in order to identify factors such as beams with the highest levels of instantaneous traffic demand, the type of data contained within the traffic of each beam (voice, video, interactive, bulk, etc.), priority of the traffic contained in the beams, etc. The beam list can then be reordered based on the amount of instantaneous traffic demand alone or in combination with any of the aforementioned factors. The beam constraint calculator 216 initially selects the highest ranked beam (e.g., highest traffic demand) for inclusion in the active beam set. The beam constraint calculator 216 examines each subsequent beam in the list and applies one or more stayout constraints in order to determine whether a particular beam should be included in the active beam set.

For example, the beam constraint calculator 216 can examine the beam with the second highest amount of traffic demand to determine whether or not it is located within proximity of the first beam added to the active beam set. More particularly, the location of the beams relative to each other can result in interference and/or signal degradation that can otherwise affect the signal quality of terminals within those beams despite being the best beams for communicating. Additionally, the relative location of the beams can affect the amount of power used to transmit so as to potentially exceed certain requirements. If the beam with the second highest traffic demand level is at a satisfactory location relative to the existing beam within the active beam set, and meets additional stayout constraint requirements, it is added to the active beam set. Thus, the beams selected for the active beam set are likely not adjacent to each other in order to avoid high interference levels.

Next, the beam constraint calculator 216 analyzes the beam with the third highest traffic demand from the list. Again the stayout constraints are applied, but now they must be applied with respect to the two existing beings in the active beam set. If the stayout constraints can be satisfied for the third beam, it is added to the active beam set. If the stayout constraints cannot be satisfied, however, then the third beam is not added. The beam constraint calculator 216 would then move on to examine the fourth beam in the list. This process would continue until the active beam set has been selected. Depending on the specific implementation, however, the size of the active beam set can vary from system to system. For example, a system with 1000 beams can utilize and active beam set which consists of 50 beams that are active for $\frac{1}{20}$th of the total beam illumination time. Thus, if the total illumination time for the beams in the system is 1 second, then each active beam set would be illuminated for 0.05 second ($\frac{1}{20}$th). The process would be repeated for 19 additional active beam sets. Depending on the specific implementation and current traffic demands, the entire coverage area may not be illuminated by 20 active beam sets during the total illumination time.

The active beam set is used by the queuing unit 218 in order to identify which terminal traffic data should be dequeued. As previously discussed, the queuing unit 218 maintains a separate queue for internet traffic destined for each terminal in the satellite communication system. Upon examining the active beam set, the queuing unit 218 can identify the queues associated with each terminal that has been mapped to beams in the active beam set. The queues corresponding to terminals in the active beam set are supplied to the baseband components 220 where they are processed to create a data block 222 that will be transmitted via the active beam set.

According to various embodiments, the data block 222 contains a plurality of superframes which correspond to data for transmission via each beam in the active beam set. For example, superframe_1 would be transmitted by the first beam in the active beam set. Superframe_2 and superframe_3 would be transmitted by the second and third beams from the active beam set, respectively. Thus, if the active beam set contains 50 beams, superframe_n would correspond to the 50th superframe in the data block 222, and contain data transmitted via the 50th beam from the active beam set.

According to at least one embodiment, each superframe can be transmitted as a composite waveform containing independently selected parameters (e.g., modulation, coding, etc.) for encoding traffic data corresponding to each terminal in the beam. For example, if the first beam from the active beam set contains 10 terminals, then superframe_1 from the data block 222 would contain traffic data for the corresponding 10 terminals. As discussed in greater detail below, superframe_1 would be in the form of a composite waveform containing 10 segments corresponding to the 10 terminals. Furthermore, the parameters for encoding each segment of the waveform would be independently selected such that they may or may not match each other. More particularly, each of the ten waveforms may have different encoding parameters, two waveforms may have the same encoding parameters, three waveforms may have the same encoding parameters, etc. In alternative embodiments a slot may serve more than one terminal if the modulation and coding needs for those terminals can be served by the modulation and coding used in that slot.

According to various embodiments, the EsNo value predicted for each terminal by the report processing unit 210 can be used by the baseband components 220 in order to determine the best encoding parameters (e.g., modulation, coding, etc.) that should be used in order to optimize the signal quality levels for the corresponding terminal. Depending on the specific implementation, the report processing unit 210 can supply all of the predicted EsNo values to the baseband components 220, and the baseband components 220 can identify values which correspond to terminals in the active beam set. Alternatively, the report processing unit 210 can be configured to only transmit EsNo values corresponding to terminals within the active beam set.

According to various embodiments, traffic data can be prioritized by terminal prior to being dequeued on the superframe. Such prioritization can be made, for example, based on the age of traffic data for the terminals. Thus, terminals with the oldest traffic data could be given the highest level of priority, and dequeued onto the superframe first. The prioritization may also consider factors such as traffic priority, traffic class, traffic type, quality of service, etc. For example baseband components 220 and/or queuing unit 218 may be configured to analyze the traffic data and assign a higher prioritization level a voice over internet protocol (VoIP) session. The baseband components 220 and/or queuing unit 218 may also assign a higher prioritization level to VoIP session in accoring with contents of header fields contained in packets of the traffic data. Conversely, a lower prioritization level may be assigned to bulk or internet traffic. Furthermore, traffic such as streaming videos, movies, etc. can be assigned varying prioritization levels based on storage and caching capabilities available at the recipient terminal. Once all the terminals for a particular beam have been classified, they are dequeued onto the superframe sequentially until the superframe is full.

According to various embodiments, each superframe is a fractional period in length so that the data block can be transmitted within the time allocated for each hop. Thus, depending on the amount of traffic data that will be transmitted to each terminal, it is possible that the superframe may become full prior to dequeuing data from lower priority terminal queues. Under such conditions, traffic data corresponding to such terminals may be returned to the appropriate queues and transmitted on a subsequent hop. According to other implementations, the queuing unit 218 can maintain copies of traffic data supplied to the baseband components 220 until receiving confirmation that such traffic data has been successfully dequeued onto the superframes. According to further implementations, traffic data for each terminal can be dequeued onto the superframe directly from the queuing unit 218. If the superframe becomes full prior to reaching data corresponding to one or more lower priority terminals, the traffic data would simply remain within the queuing unit 218. According to still further implementations, a fair access policy (FAP) can be applied so that a certain amount of traffic data is transmitted for each terminal. For example, the maximum amount of data for each terminal can be limited based, at least in part, on priority so that the superframe contains data for each terminal. The amount of data for each terminal, however, may vary based on the specific details of the FAP. Once the data block 222 has been completed, it is transmitted to the satellite so that the active beam set can be used to supply data to the terminals.

Figure 3:
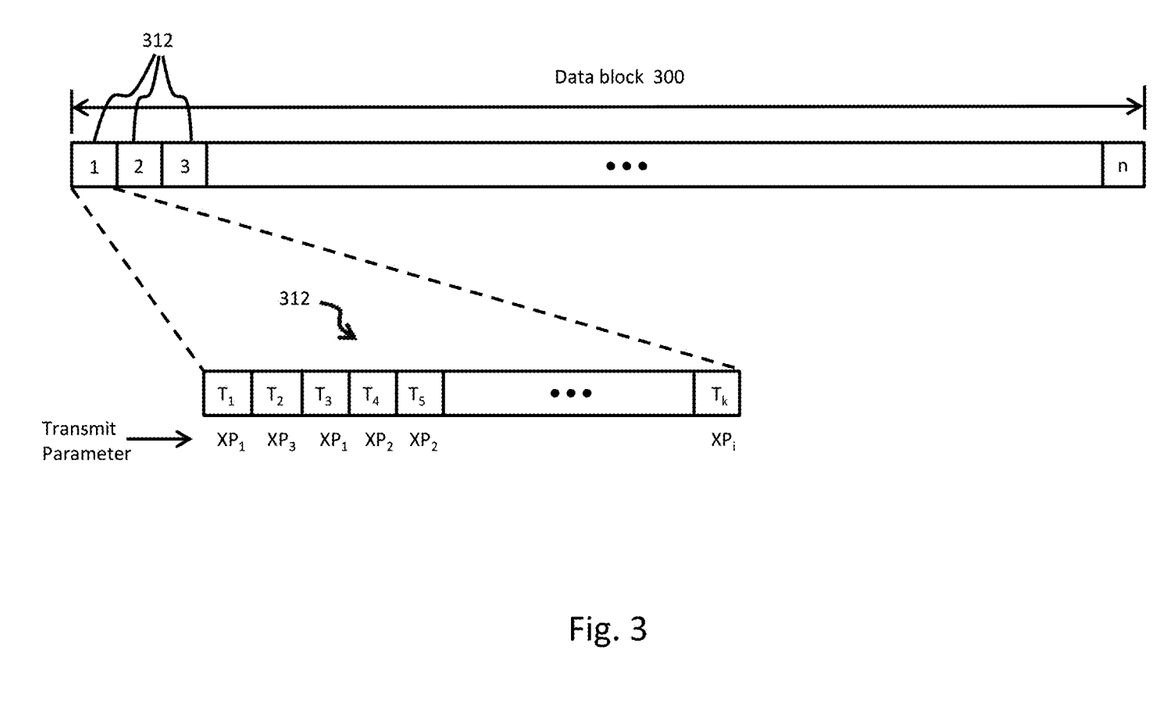
FIG. 3 is a diagram illustrating the structure of a data block used to transmit data, according to one embodiment.

FIG. 3 illustrates details of an exemplary data block 300 in accordance with one or more embodiments. The data block 300 contains a plurality of superframes 312 corresponding to the number of beams in the active beam set. Accordingly, if the active beam set contains 50 beams, then the data block 300 would contain 50 superframes 312. As further illustrated in FIG. 3, the first superframe 312 contains data corresponding to a plurality of terminals, namely terminals T1-Tk. As previously discussed, the terminals can be classified based on various parameters, such as age of traffic data, traffic priority, traffic type/class, quality of service, etc. While FIG. 3 illustrates the superframe 312 as containing multiple terminal slots (T1-Tk), it should be noted that is done for purposes of explaining various features. As previously discussed, the superframe 312 is configured as a composite waveform with wave segments destined for corresponding terminals. Thus, each slot on the superframe 312 actually represents the wave segment corresponding to the terminal listed in FIG. 3.

Once reclassified, traffic data for terminal T1 is dequeued onto the superframe 312 and encoded with parameters XP1. Next, the data for terminal T2 is dequeued onto the superframe 312 using parameters XP3. According to the illustrated embodiment, data for terminal T3 is dequeued onto the superframe 312 using the same parameters as terminal T1, namely XP1. Next, data for terminals T4 and T5 are dequeued onto the superframe 312 using the same parameters, XP2. As previously discussed, this process continues until the superframe 312 is complete. Depending on the specific implementation, terminal Tk may or may not correspond to the last terminal assigned to the first beam. If the higher priority terminals contain traffic data sufficient to fill the superframe 312, traffic data from lower priority terminals may be omitted from the superframe 312. The final waveform for terminal Tk would therefore not be the last terminal assigned to the beam. If the system implements techniques (e.g., FAP) to guarantee the superframe 312 contain traffic data corresponding to each terminal in the beam, however, then the traffic data for terminal Tk would to the last terminal assigned to the beam.

Figure 4:
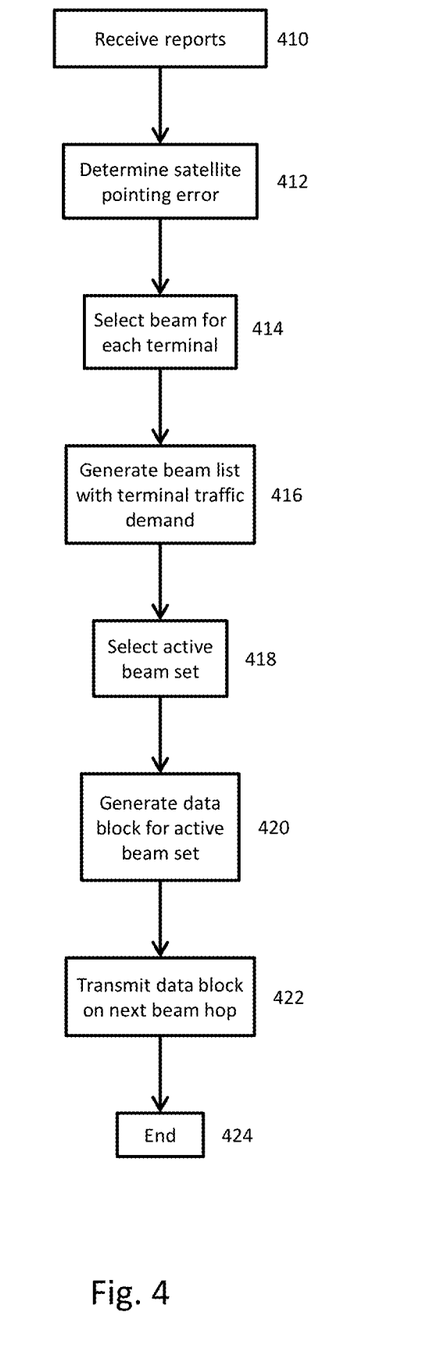
FIG. 4 is a flowchart of a process for grouping terminals with the beam providing the best signal quality, according to one embodiment.

FIG. 4 illustrates a process for grouping terminals with the beam providing the best signal quality for the current system hop, according to one or more embodiments. At 410, reports are received from the terminals in the satellite communication system. As previously discussed, the reports contain measurements taken by the terminals while receiving data from the satellite. The reports can include, for example, signal strength, interference levels, etc. in order to provide an indication of the quality of the signal currently being received by the terminal. The reports can be transmitted at periodic or aperiodic intervals. According to at least one embodiment, the reports are transmitted by terminals after each hop. At 412, a satellite pointing error (or antenna pointing error) is determined. The satellite pointing error can be determined, for example, based on an analysis of the contents of the reports received from the terminals. The reports can be aggregated over multiple hops to determine the satellite pointing error, or after each hop. Since the satellite communication system utilizes a single antenna, the pointing error is applicable to all terminals.

At 414, the best being for communicating with each terminal is selected. The best beam for a particular terminal can correspond, for example, to the beam which optimizes signal quality for the terminal under the current satellite pointing error. Thus, each beam will be matched with one or more terminals that can achieve the best signal quality under the current conditions. At 416, a beam list is generated. Each entry in the beam list contains the traffic demand information for each terminal within the beam. According to at least one embodiment, the terminal traffic demand can correspond to the amount of data currently stored in a queue for transmission to the terminal. Thus, each beam in the beam list an aggregated amount of traffic from each terminal assigned to the beam.

At 418, an active beam set is selected. The active beam set corresponds to the subset of beams that will be active on the next hop of the system. As previously discussed, the satellite hopping systems differ from conventional satellite systems at least in the manner in which data is transmitted through the beams. For example, conventional satellite systems continuously illuminate all beams and divide the spectrum such that each beam gets a fraction of the entire communication spectrum all the time. In contrast, satellite hopping systems assign the entire spectrum to the active beam set for a fraction of the total illumination interval. At 420, a data block is generated for the active beam set. According to at least one embodiment, the data block can consist of a plurality of superframes, where each superframe corresponds to a beam in the active beam set. At 422, the data block is transmitted via the active beam set during the next system hop. The process ends at 424. It should be noted, however, the same process is repeated for each hop in the satellite communication system.

Figure 5:
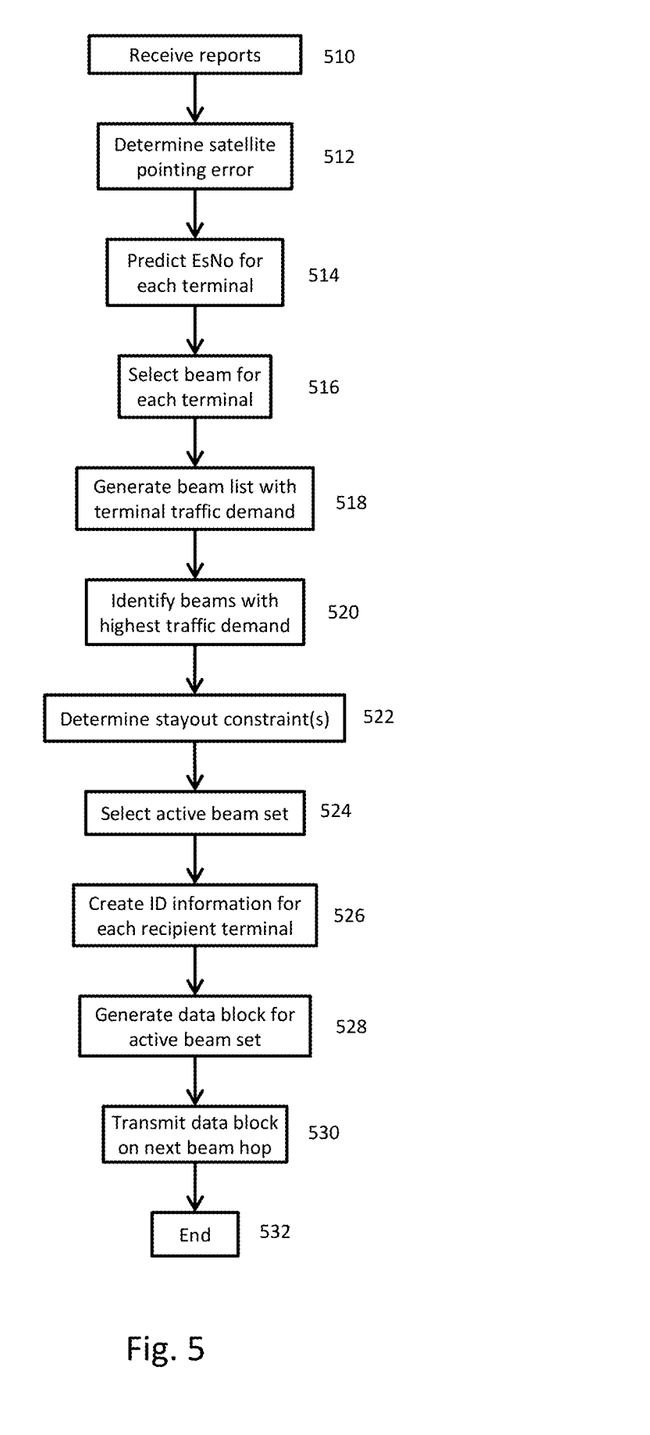
FIG. 5 is a flowchart of a process for grouping terminals with the beam providing the best signal quality, according to various embodiments.

FIG. 5 illustrates a process for grouping terminals with the best signal quality for the current system hop, according to various embodiments. At 510, reports containing information pertaining to the quality of signals being received at each terminal are received. The reports can be received at regular or irregular intervals. For example, the reports can be received after each hop of the satellite communication system. At 512, a satellite pointing error is determined. The satellite pointing error affects communication with all terminals in the satellite communication system, and is determined based on analysis of the reports received from the terminals. At 514, the EsNo value for each terminal is predicted. This value can provide, for example, a representation of the signal quality level that the terminal should be experiencing if using the most appropriate beam for communication. At 516, the best beam for each terminal to use for communication is selected. This can result, for example, in a terminal to beam match where one or more terminals can be assigned to each beam.

At 518, a beam list containing terminal traffic demand is generated. According to at least one embodiment, the beam list contains a list of beams with the instantaneous level of traffic demand from all terminals assigned to that each beam. As previously discussed, the traffic demand can correspond to external information, such as internet traffic, that is awaiting transmission to the terminal. At 520, beams with the highest traffic demand are identified. At 522, one or more stayout constraints are determined. According to various embodiments, the stayout constraints correspond to limitations that may restrict certain combinations of beams from being simultaneously active. At 524, the stayout constraints are applied to the beam list in order to select the active beam set.

According to at least one embodiment, the stayout constraints can be sequentially applied to the beam list after it has been sorted based on traffic demand. Thus, the beam with the second highest traffic demand would be subject to restrictions based on whether or not it can be simultaneously active with the first beam. The third beam would be subject to stayout constraints pertaining to the first two beams. This process would continue by sequentially applying the stayout constraints to the next beam on the beam list until the active beam set has been selected.

At 526, identification information is created for each terminal in the active beam set. According to at least one embodiment, the identification information can be in the form of a spread spectrum overlay, a unique word in the header wave segments in the superframe, a unique value stored in individual packet headers, etc. At 528, a data block is generated for the active beam set. According to various embodiments, the data block contains all of the information that will be transmitted via the active beam set. For example, the data block can consist of a plurality of superframes, where each superframe corresponds to data for transmission by one of the beams in the active beam set. At 530, the data block is transmitted on the next system hop. The process ends at 532. Although not illustrated in FIG. 5, the same process is repeated for each hop in the satellite communication system.

Figure 6:
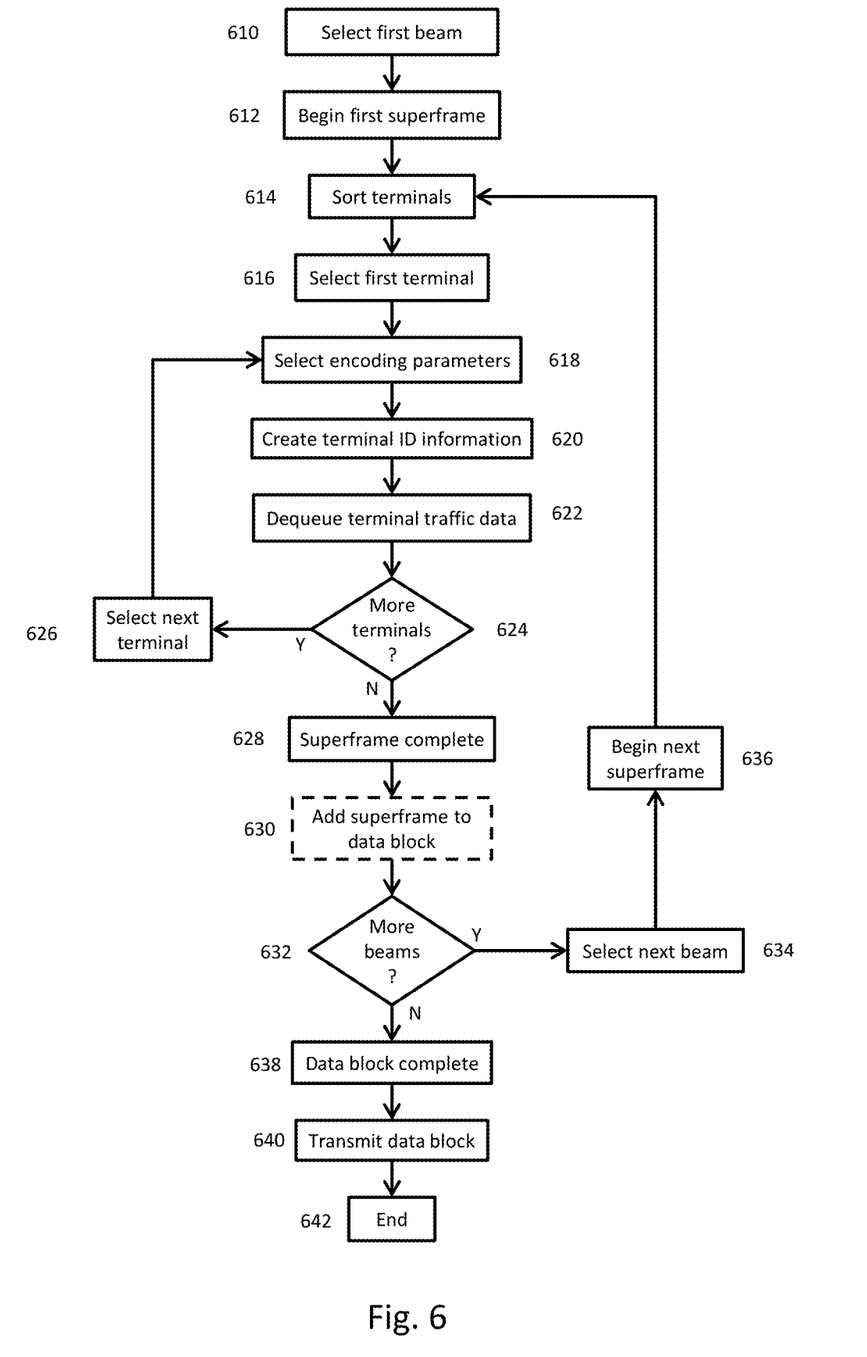
FIG. 6 is a flowchart of a process for dequeuing data onto a data block, according to one or more embodiments.

FIG. 6 illustrates a process for dequeuing data onto a data block, according to one or more embodiments. At 610 the first beam from the active beam set is selected. At 612, assembly of the first superframe that will be added to the data block is initiated. At 614, the terminals assigned to the first beam are sorted. According to various embodiments, the terminals can be sorted based on various factors including one or more of age of traffic data, priority of traffic data, type of traffic data, quality of service, etc. According to further embodiments, various policies may be applied in order to deliver to some amount of traffic data each terminal assigned to the beam. The specific amount of traffic data can vary depending on the policy being applied.

At 616, the first terminal is selected. If the terminals were sorted by age of traffic data, for example, then the first terminal would correspond to the terminal having the oldest traffic data stored in its queue at the queuing unit. At 618, parameters are selected for encoding traffic data for the first terminal onto the superframe. According to at least one embodiment, the encoding parameters can be selected based, at least in part, on EsNo values predicted for the terminal based on reports received, for example, by the report processing unit. At 620, identification information is created for the terminal. The terminal identification information can correspond to information that is included in the superframe so that each terminal can identify its intended data from the composite waveform of the superframe. The terminal identification information can be in the form of a unique word in the waveform header, a unique value in the packet headers of data in the waveform, etc. At 622, traffic data for the terminal is dequeued onto the superframe.

At 624 it is determined whether there are additional terminals assigned to the selected beam. If there are additional terminals, then the next terminal is selected at 626. Control returns to 618 where encoding parameters are selected for the next terminal. If there are no additional terminals, then control passes to 628. According to one or more embodiments, traffic data from higher sorted terminals may fill the superframe prior to reaching all terminals. According to such embodiments, the traffic data from the remaining terminals can be returned to their corresponding queues. According to further embodiments, fair access policies can be implemented to ensure that the superframe contains a minimum amount of data from each terminal assigned to the beam. At 628, the superframe is considered complete.

At 630, the completed superframe can be optionally added to the data block. According to other embodiments, however, the superframe can be created in parallel and simultaneously added to the data block in their appropriate positions. At 632, it is determined whether there are additional beams remaining in the active beam set. If there are additional beams remaining, then the next beam is selected at 634. At 636, assembly of the next superframe is initiated. Control then returns to 614 where the terminals for the next beam are sorted. If there are no additional beams remaining, then at 638, the data block is considered complete. At 640, the data block is transmitted. As previously discussed, the data block is transmitted from the gateway to the satellite. The satellite subsequently transmits the superframes in the data block via corresponding beams in the active beam set. The process ends at 642.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described terminals, receivers, transmitters, transceivers, gateway, network management system, beam manager, report processing unit, beam selector, beam demand totalizer, beam constraint calculator, queuing unit, and baseband components. Additionally, such hardware can be interfaced to connect and/or facilitate communication between different components such as the gateway and beam manager, gateway and NMS, etc.

Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 7:
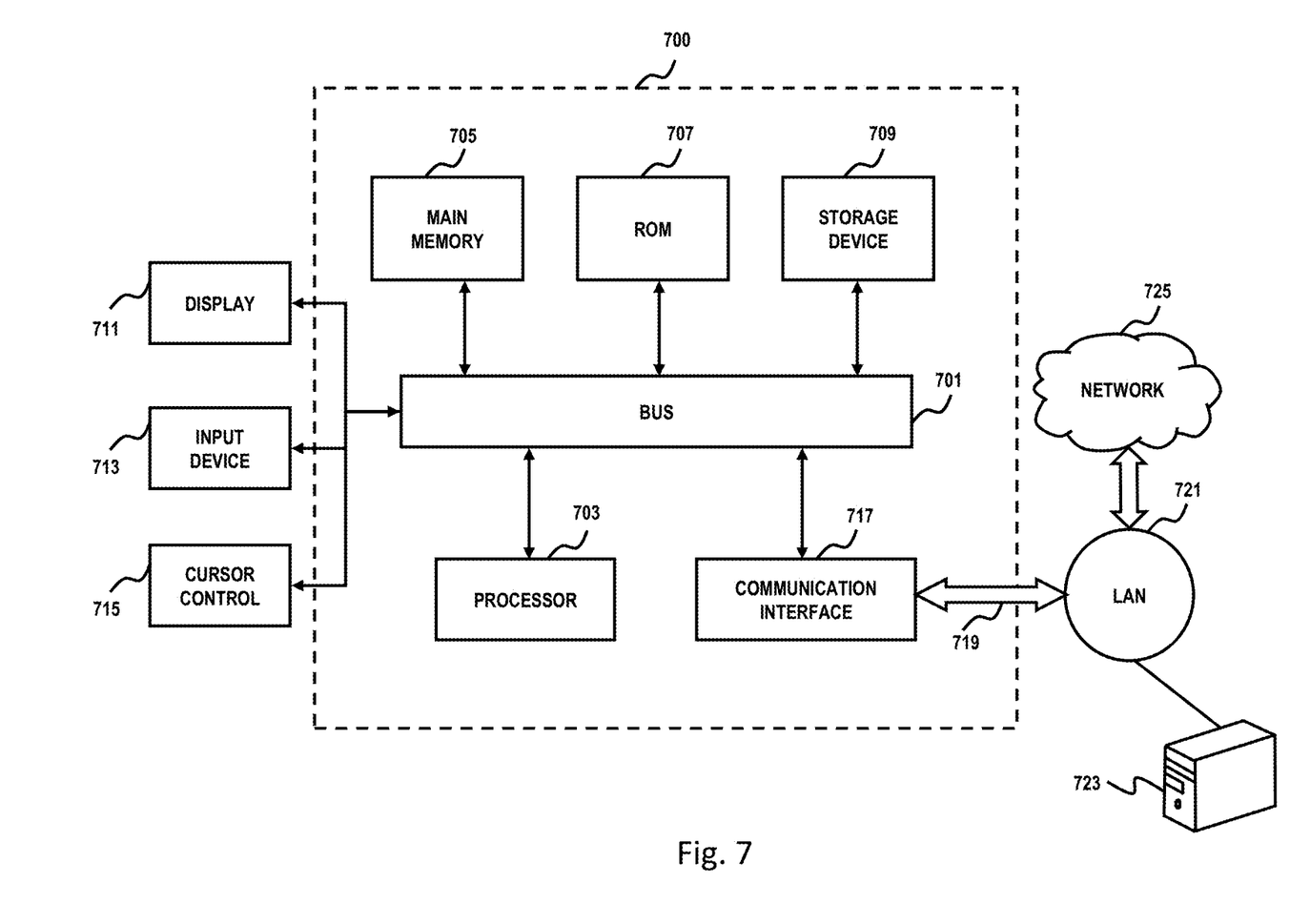
FIG. 7 is a diagram of a computer system that can be used to implement various exemplary features and embodiments.

FIG. 7 is a diagram of a computer system that can be used to implement features of various embodiments. The computer system 700 includes a bus 701 or other communication mechanism for communicating information and a processor 703 coupled to the bus 701 for processing information. The computer system 700 also includes main memory 705, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a light emitting diode (LED) or other flat panel displays, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. Additionally, the display 711 can be touch enabled (i.e., capacitive or resistive) in order facilitate user input via touch or gestures.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a High Definition Multimedia Interface (HDMI), etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 such as a wide area network (WAN) or the Internet. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Non-volatile media can further include flash drives, USB drives, microSD cards, etc. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
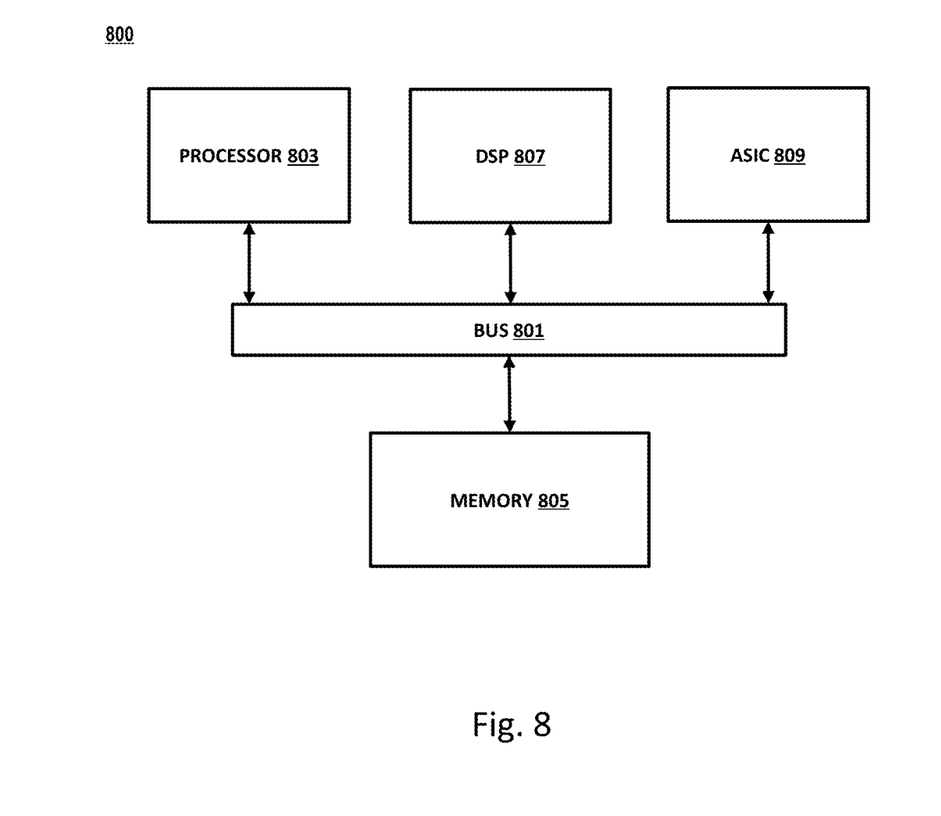
FIG. 8 is a diagram of a chip set that can be used to implement various exemplary features and embodiments.

FIG. 8 illustrates a chip set 800 upon which features of various embodiments may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the figures.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 805 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
receiving reports from a plurality of terminals in a beam hopping satellite communication system;
determining a pointing error associated with a satellite antenna based, at least in part, on contents of the reports;
selecting a best beam for each terminal, wherein each best beam corresponds to the best beam for communicating with the selected terminals based, at least in part, on the pointing error;
generating a beam list containing an instantaneous traffic demand of terminals for each beam in the satellite communication system;
selecting an active beam set from the beam list for a next hop in the satellite communication system; and
generating a data block for transmission via the active beam set on the next hop,
wherein the data block contains information corresponding to the instantaneous traffic demand of the active beam set.

2. The method of claim 1, wherein the reports are transmitted after each beam hop or at predetermined intervals.

3. The method of claim 1, wherein:
n terminals are associated with each selected best beam;
n is a subset of total terminals in the satellite communication system; and
n≥0.

4. The method of claim 1, wherein a same frequency and polarization is used for all beams in the active beam set.

5. The method of claim 1, wherein data transmitted via each beam in the active beam set contains, in part, information for identifying recipient terminals.

6. The method of claim 1, wherein the reports contain, in part, signal quality measurements associated with each terminal.

7. The method of claim 6, wherein the signal quality measurements are based, at least in part, on signal strength and interference levels obtained by each terminal.

8. The method of claim 1, wherein the active beam set is selected based, at least in part, on beams having the highest traffic demand levels.

9. The method of claim 8, wherein the active beam set is further selected based on traffic priority, quality of service (QoS), or both.

10. The method of claim 1, wherein the active beam set is selected based, at least in part, on a stayout constraint which minimizes interference between beams in the active beam set.

11. The method of claim 1, wherein:
the data block comprises a plurality of superframes corresponding to the number of beams in the active beam set; and
each superframe contains traffic data for transmission via a corresponding beam in the active beam set.

12. The method of claim 11, wherein each superframe is transmitted as a composite waveform, and encoding parameters are independently selected for traffic data corresponding to each terminal.

13. The method of claim 11, further comprising dequeuing traffic data for each terminal onto the superframe corresponding to the best beam selected for the terminal.

14. The method of claim 13, wherein the traffic data for terminals in each beam is dequeued based on at least one of age, priority, class, and quality of service (QoS).

15. The method of claim 13, wherein the traffic data for each terminal is encoded based on reports received from the corresponding terminal.

16. The method of claim 1, wherein all beams in the satellite communication system comprise first beams formed by a first antenna, and further comprising:
forming second beams overlaying a same coverage area as the beams formed by the first antenna,
wherein the second beams have an opposite polarization from the first beams.

17. The method of claim 1, wherein all beams in the satellite communication system are formed by a first antenna, and further comprising:
forming second beams overlaying a same coverage area as the beams formed by the first antenna,
wherein the second beams are formed by a second antenna, and wherein the second antenna operates on an opposite polarization from the first antenna.

18. The method of claim 1, wherein:
traffic data for each terminal is stored in a corresponding queue; and
the data block contains traffic data from queues corresponding to terminals located within the active beam set.

19. The method of claim 18, wherein transmit parameters such as modulation and coding are independently selected for traffic data from each queue.

20. The method of claim 1, wherein selecting a best beam for each terminal is further based on a ratio of symbol energy to noise energy (EsNo) value predicted from analysis of the reports.

21. An apparatus comprising:
one or more processors configured to:
receive reports from a plurality of terminals in a beam hopping satellite communication system;
determine a pointing error associated with a satellite antenna based, at least in part, on contents of the reports;
select a best beam for each terminal, wherein each best beam corresponds to the best beam for communicating with the selected terminals based, at least in part, on the pointing error;
generate a beam list containing an instantaneous traffic demand of terminals for each beam in the satellite communication system;
select an active beam set from the beam list for a next hop in the satellite communication system; and
generate a data block for transmission via the active beam set on the next hop,
wherein the data block contains information corresponding to the instantaneous traffic demand of the active beam set.

* * * * *